(12) United States Patent
Barabas-Lammert

(10) Patent No.: US 8,018,709 B2
(45) Date of Patent: Sep. 13, 2011

(54) ACTUATOR FOR CONTROL VALVES AND/OR SHUT-OFF DEVICES

(76) Inventor: Kurt Barabas-Lammert, Solingen (DE)

( * ) Notice: Subject to any disclaimer, the term of this patent is extended or adjusted under 35 U.S.C. 154(b) by 875 days.

(21) Appl. No.: 12/034,804

(22) Filed: Feb. 21, 2008

(65) Prior Publication Data

US 2008/0204175 A1    Aug. 28, 2008

(30) Foreign Application Priority Data

Feb. 26, 2007 (DE) .................. 20 2007 002 760 U

(51) Int. Cl.
*H01H 47/12* (2006.01)
(52) U.S. Cl. .................................................. 361/160
(58) Field of Classification Search .................. 361/160
See application file for complete search history.

(56) References Cited

U.S. PATENT DOCUMENTS

| | | | | |
|---|---|---|---|---|
| 3,774,642 A | * | 11/1973 | Gray | 137/625.65 |
| 3,858,135 A | * | 12/1974 | Gray | 335/266 |
| 4,743,821 A | * | 5/1988 | Hall | 318/599 |
| 4,918,678 A | * | 4/1990 | Dolby | 369/43 |
| 5,022,629 A | * | 6/1991 | Tibbals, Jr. | 251/129.02 |
| 5,983,847 A | * | 11/1999 | Miyoshi et al. | 123/90.11 |
| 6,024,298 A | * | 2/2000 | Kelly | 239/127 |
| 6,674,352 B2 | * | 1/2004 | Montuschi et al. | 335/274 |
| 2003/0140907 A1 | * | 7/2003 | Gagnon et al. | 123/568.26 |
| 2004/0113731 A1 | * | 6/2004 | Moyer et al. | 335/220 |

FOREIGN PATENT DOCUMENTS

| | | |
|---|---|---|
| DE | 102004037360 | 2/2005 |
| DE | 102005026535 | 12/2006 |

* cited by examiner

*Primary Examiner* — Ronald W Leja
(74) *Attorney, Agent, or Firm* — McGlew and Tuttle, P.C.

(57) ABSTRACT

The subject of the present invention is an actuator for control valves and/or shut-off devices with an actuating element acting on a closing or opening element, in which the actuating element comprises a push or pull rod (20, 21), which is in drive connection with the axially movable part of an electromagnetic drive unit designed as a moving coil from a magnet coil (3, 4) and a cylindrical solenoid plunger (1) and is moved into its inoperative position by a resetting spring (15) and is held in that position. To make it possible to use such an actuator instead of the prior-art electric motor, pneumatic or hydraulic drives, provisions are made for the respective actual positions of the actuating element (20, 21) to be detected by an electrical or electronic position controller (36) and transmitted to an electronic actuating amplifier (35), which sends an operating voltage, which is necessary for actuating the actuating element (20, 21) and can be varied between a minimum and a maximum, to the moving coil (3, 4) when a command signal (BS) is present, until the position controller (36) signals the position of the actuating element (20, 21) as feedback, which is preset with the command signal (BS).

20 Claims, 4 Drawing Sheets

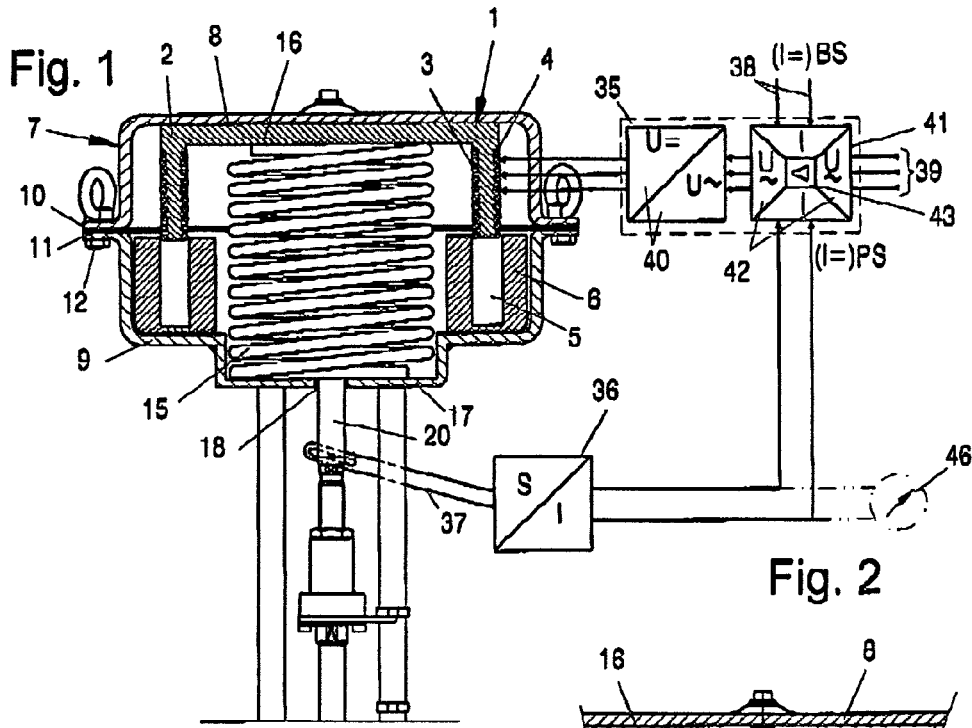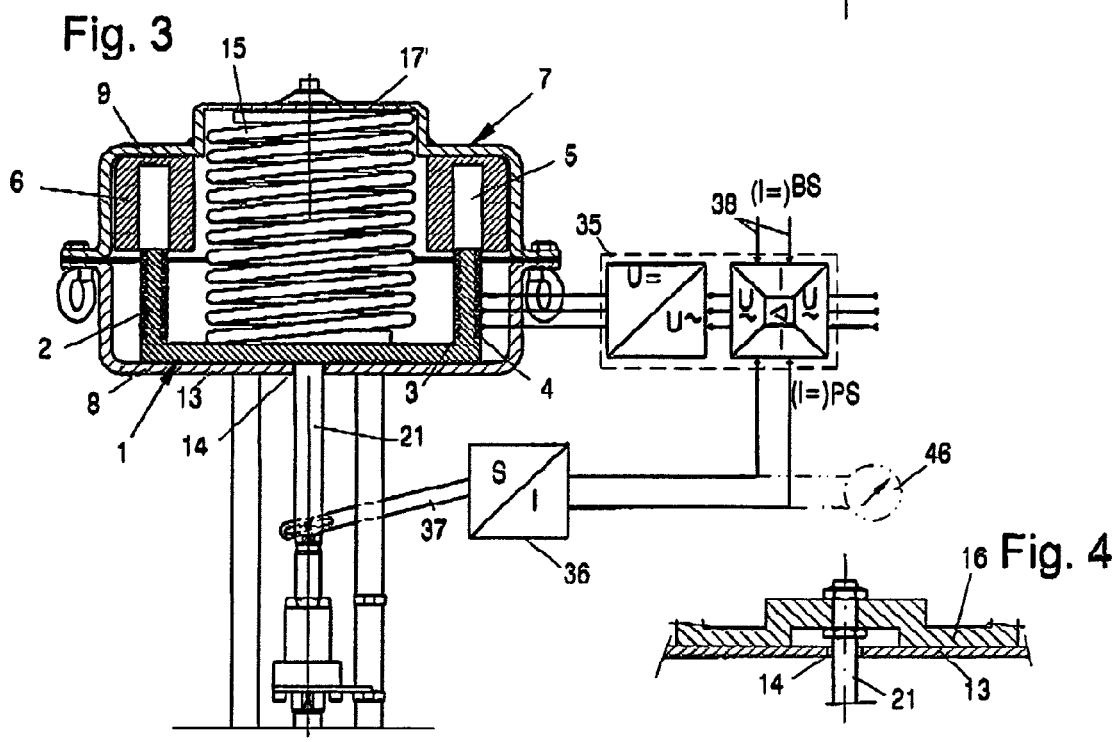

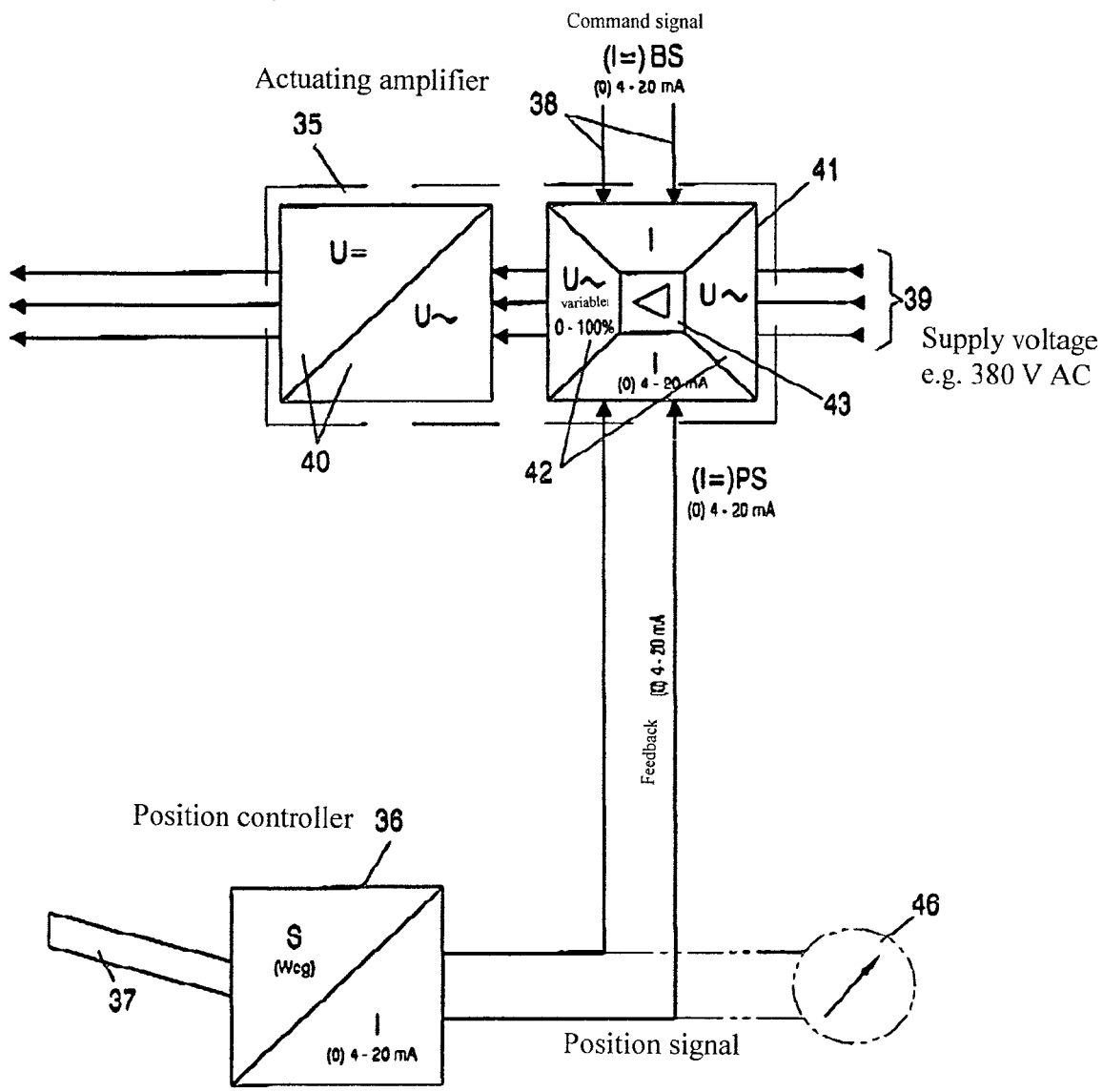

ACTUATOR FOR CONTROL VALVES AND/OR SHUT-OFF DEVICES

CROSS REFERENCE TO RELATED APPLICATIONS

This application claims the benefit of priority under 35 U.S.C. §119 of German Application DE 20 2007 002 760.5 filed Feb. 26, 2007, the entire contents of which are incorporated herein by reference.

FIELD OF THE INVENTION

The present invention pertains to an actuator for control valves and/or shut-off devices, such as on-off armatures and the like, with an actuating element, which acts on a closing or opening element, in which the actuating element comprises a push rod or pull rod, which is in drive connection with the axially movable part of an electromagnetic drive unit, which comprises a magnet coil and a cylindrical solenoid plunger and is designed as a moving coil, is moved into its inoperative position by a resetting spring and is held in that position.

BACKGROUND OF THE INVENTION

Actuators for control valves and shut-off devices have hitherto been operated almost exclusively pneumatically or by means of electric motors, i.e., they have been provided with pneumatic drive units or with electric motors. There are electromagnetic actuators, which have an actuating element, which can be brought into a plurality of rotated positions and which can be adjusted by a plurality of differently positioned coils (DE 2004 037 360 A1, DE 10 2005 026 535 A1). While the control means are relatively simple in pneumatic drive units, they do require the presence of a compressed air source, electric motor drives usually require expensive motor control means and amplifier means and optionally additional gear means. In addition, the working torques that can be attained are low in case of small overall dimensions.

It is generally known that such solenoid plunger units or moving coils of the type mentioned in the introduction are able to generate strong actuating forces even in case of very small size, so that they are also suitable for reliably actuating closing elements of valves by air pressure or on-off devices between two defined end positions and to guarantee at the same time the two end positions of the respective actively moving parts as safety positions without additional auxiliary forces with special energy supply being necessary when the necessary electrical energy, more precisely, the sufficient amperage is present in a correspondingly oversized manner. Aside from the fact that no defined intermediate positions located between the two end positions can be set for the closing elements actuated by the solenoid plunger magnets in the case of the prior-art solenoid plunger magnets, these closing elements are always actuated with the same actuating signal and with the same operating voltage and with the same work output, i.e., with the same energy consumption.

SUMMARY OF THE INVENTION

The basic object of the present invention is therefore to provide a simple and reliably operating actuator of the type mentioned in the introduction with an adapted, strong actuating force and a general safety position without additional auxiliary energy supply.

This object is accomplished according to the present invention by the respective actual positions of the actuator being detected by an electrical or electronic positioner or position controller and transmitted to an electronic actuating amplifier, which applies to the moving coil the necessary operating voltage, which is necessary for the actuation of the actuating element and can be varied between a minimum and a maximum when a command signal is present, until the position controller signals as feedback the position of the actuating element, which is preset with the command signal.

The operating voltage can assume maximally the value (100%) of the supply voltage present at the input of the actuating amplifier.

The operating voltage, i.e., the driving energy, can be adapted to the respective actuating force needed with the control and adjusting means provided according to the present invention, and it is also possible to reach any desired intermediate position. The additional advantage that any desired other intermediate position of the parts that actively perform motions, namely, of the moving coil, can be actuated with a corresponding control command from any intermediate position is also important in this connection. Thus, it is possible to perform not only an "on/off" function but also true adjusting functions corresponding to presettable parameters, for example, corresponding to a variable command signal. It is particularly advantageous in this connection that when necessary, the position controller superimposes the position signal to the command signal in such a way that it signals a need for a stronger force and brings about as a result a corresponding increase in the operating voltage applied to the moving coil, which voltage may reach up to 100% of the supply voltage. This advantage is especially significant when the actuation of the actuating element is made difficult by any interfering forces.

Whether the magnet coil with the solenoid plunger or the permanent magnet is designed as the actively moving part in actuators comprising an actuating amplifier including a rectifier unit and a control unit, which comprises an electronic unit (microprocessor) depends on design viewpoints.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematically simplified sectional view of an electromagnetic actuator, in which a push rod is connected to a solenoid plunger carrying the magnet coil as the actively moving part;

FIG. 2 is a simplified sectional view of the connection between the push rod and a moving coil body from FIG. 1;

FIG. 3 is a schematically simplified sectional view of an electromagnetic actuator, in which a pull rod is connected to a solenoid plunger carrying the magnet coil as the actively moving part;

FIG. 4 is a simplified sectional view of the connection between the pull rod and a solenoid plunger body from FIG. 3;

FIG. 9 is a block diagram of the actuating amplifier and of the position controller.

DESCRIPTION OF THE PREFERRED EMBODIMENTS

Figure 1A:
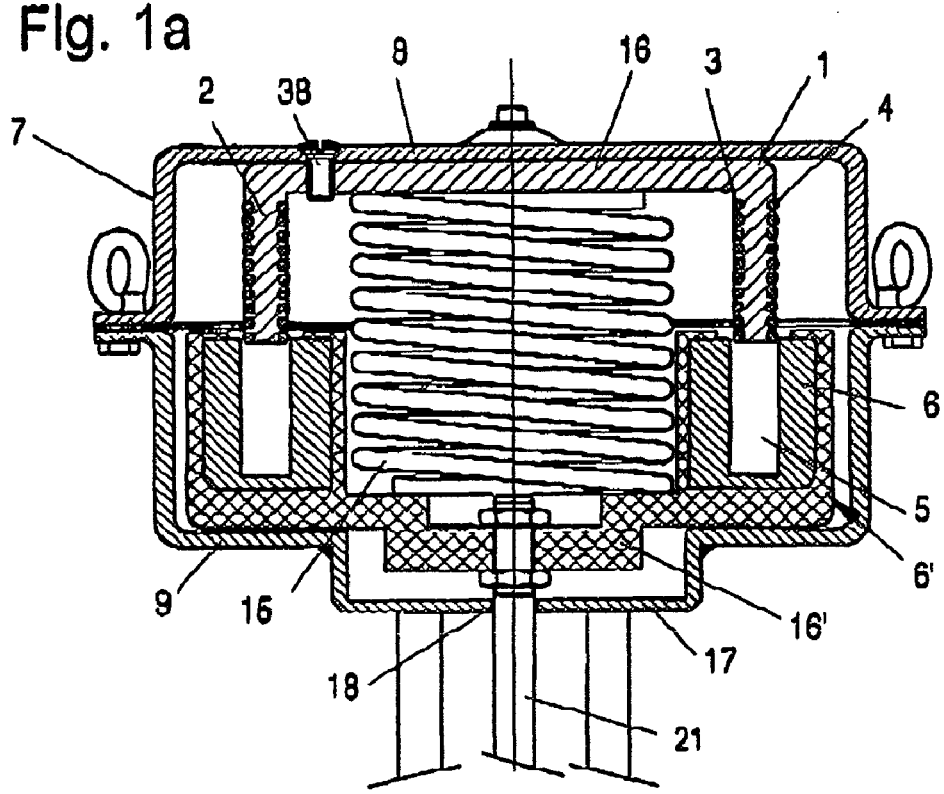
FIG. 1a is a schematically simplified sectional view of an electromagnetic actuator, in which a pull rod is connected to a permanent magnet as an actively movable part.

The actuator for control valves and/or on-off devices, which is shown in a schematically simplified form in FIG. 1, comprises essentially a pot-shaped solenoid plunger 1, at the cylinder wall 2 of which at least one respective magnet coil 3 and 4 is arranged in a firmly seated manner on the inside and/or on the outside. The cylinder wall 2 preferably comprises magnetizable material. The solenoid plunger 1 is mounted axially movably such that its cylinder wall 2 with the magnet coil or magnet coils 3 and 4 can plunge in an actuation direction into an annular groove 5 of a stationarily arranged, axially poled, annular permanent magnet 6.

The permanent magnet 6 with its annular groove 5 and the solenoid plunger 1 are accommodated in a two-part housing 7, which comprises a pot-shaped upper part 8 and a likewise pot-shaped lower part 9. The upper part 8 and the lower part 9 are provided with movable flanges 10 and 11, respectively, which are detachably connected to one another by means of screws 12.

Figure 5:
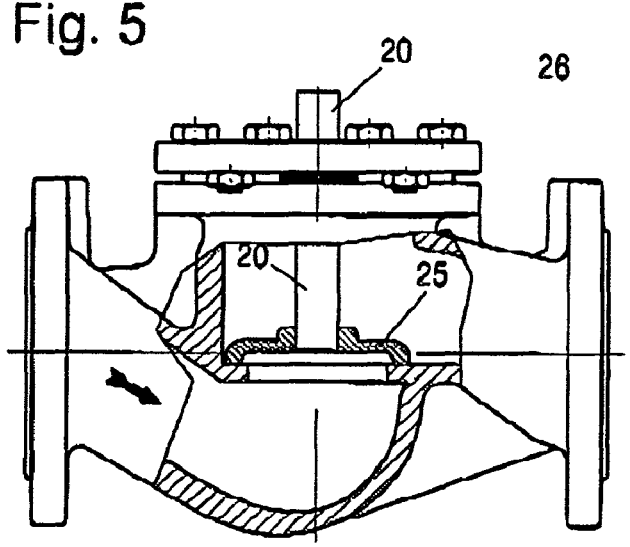
FIG. 5 is a partially cut-away side view of an on/off device.
Figure 6:
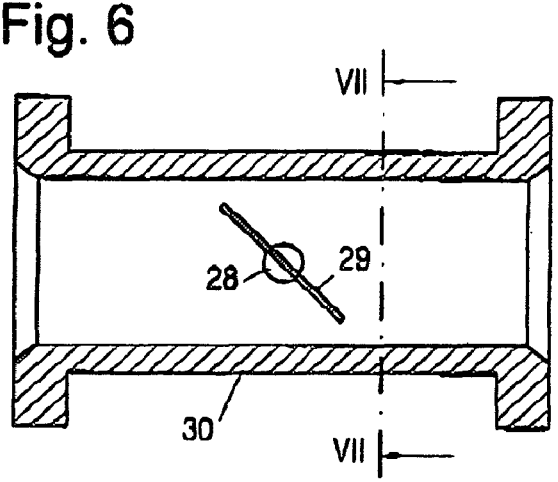
FIG. 6 is a simplified sectional view of a flanged pipe with a butterfly valve.
Figure 8:
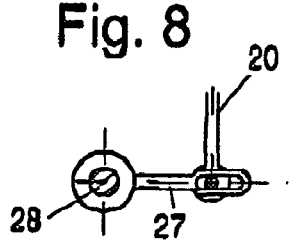
FIG. 8 is a sectional view along the line VIII-VIII from FIG. 7.
Figure 7:
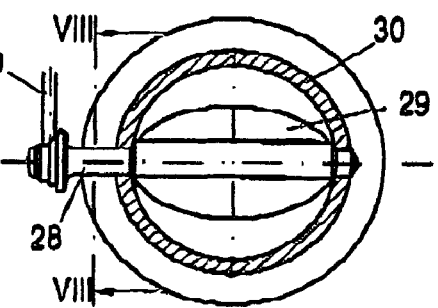
FIG. 7 is a sectional view along the line VII-VII from FIG. 6.

The solenoid plunger 1 is provided with a resetting spring 15, which is designed as a compression spring and is supported on the underside of the front wall 16 of the solenoid plunger 1, on the one hand, and on a front wall part 17 of the housing lower part 9, on the other hand. As is apparent from FIG. 2, a push rod 20, which passes through a hole 18 of the lower front wall part 17 and which is connected, for example, to the closing element 25 of an on/off device 26 according to FIG. 5, is fastened to the front wall 16 in a concentric arrangement in relation to the cylinder wall 2 of the solenoid plunger 1. It is analogously also possible to connect this push rod 20 according to FIGS. 6 through 8 to the actuating lever 27 of the bearing shaft 28 of a butterfly valve 29, which is mounted pivotably in a flanged pipe 30.

An electronic actuating amplifier 35, which is supplied by an external power source 39, e.g., with a 230-V or 380-V a.c. line voltage, and which can be controlled or adjusted by command signals BS, is provided for energizing or exciting the magnet coils 3 and 4 (cf. FIG. 9). A rectifier unit 40 and a control unit 41, which provide the d.c. driving voltage needed to excite the magnet coils 3, 4, so that these will generate the corresponding actuating force required, are integrated in the actuating amplifier 35. In the exemplary embodiment shown in FIG. 1, a position controller or sensor 36, which is connected to the push rod 20 via a lever arm 37 and whose respective working position reports to the position controller or sensor 36 in order to transmit respective corresponding position signals PS to the actuating amplifier 35 or to the control unit 41 and to bring about a corresponding excitation of the respective magnet coils 3 and 4, is electrically connected to the actuating amplifier 35. The operating voltage U=(DC) can now be increased up to the maximum value corresponding to the supply voltage U (AC) in order to always attain the actuating force necessary for reaching the respective desired positions of the actuating element, i.e., the push rod 20.

An electronic unit 43, which controls an integrated voltage controller 42 as a function of the particular command signal BS present and/or the position signal PS present, is likewise integrated for this purpose in the control unit 41. This electronic unit 43 may be, for example, a microprocessor.

This actuator can be operated with different operating voltages U (AC) respectively or rectified operating voltages U=(DC) if the magnet coils 3, 4 are designed accordingly.

The command signal BS can be sent in the form of a set point signal to the actuating amplifier 35 or to the control unit 41 via the signal input 38 in order to reach, for example, a certain intermediate position of the respective actively moving part, i.e., the actuating element 20, 21. This set point signal is always defined by a certain current intensity I or a current intensity range of, e.g., 0-20 mA or 4-20 mA direct current (DC).

The position controller 36 comprises a path transducer S, which sends a position signal PS of a defined current intensity I or of a current intensity range of, for example, 0-20 mA or 4-20 mA direct current (DC) to the control unit as a function of the particular actual position that the actuating element 20 has reached. The control unit 41 of the actuating amplifier 35 can be influenced by this position signal PS such that the variable operating voltage U (AC) will be increased when the actuating element 20 does not reach the desired position corresponding to the command signal present. The position signal BS assumes in this case the control of the operating voltage U (AC) present on the control unit 41 on the output side or of the operating voltage U=(DC) resulting therefrom, which is present on the rectifier unit 40 and on the magnet coil or magnet coils 3, 4.

As is apparent from FIGS. 1 and 2, the position controller 36 may also be provided with a position display 46, which displays the particular position in which the actuating element, the pull rod or push rod 20, 21 is set.

While the embodiment of the actuator shown in FIGS. 1 and 2 is designed for a pushing mode of operation, the exemplary embodiment according to FIGS. 3 and 4 is an actuator designed for pulling operation. This comprises exactly the same components, namely, a solenoid plunger 1 with the cylinder wall 2, at which the magnet coils 3 and 4 are arranged, as well as the axially polarized, annular permanent magnet 6 with the annular groove 5. The only difference from the embodiment according to FIGS. 1 and 2 is that the arrangement is placed upside down and a pull rod 21 is provided, which passes through a central hole 14 of the front wall 13 of the housing part 8 and which is connected to the front wall 16 of the solenoid plunger 1 in the same manner as the push rod 20. Thus pull rod 21 may also be provided with a position controller 36, which is analogously in connection with the pull rod 21 or is electronically connected to the actuating amplifier 35.

In the exemplary embodiment according to FIGS. 1 and 2, the solenoid plunger 1 exerts a pushing force on the push rod 20 when the magnet coils 3, 4 are excited. By contrast, the pull rod 21 is pulled into the housing 7 in case of corresponding excitation of the magnet coils 3 and 4. The resetting spring 15 ensures the resetting of the solenoid plunger 1 into its starting position shown in FIG. 3 when the excitation of the coils is ended in this embodiment as well.

In the embodiments described so far on the basis of FIGS. 1 and 3, the solenoid plunger 1 is always designed as the moving part, which is connected to the push rod 20 or to the pull rod 21 in order to bring about the motion of that rod in the working direction.

Figure 3A:
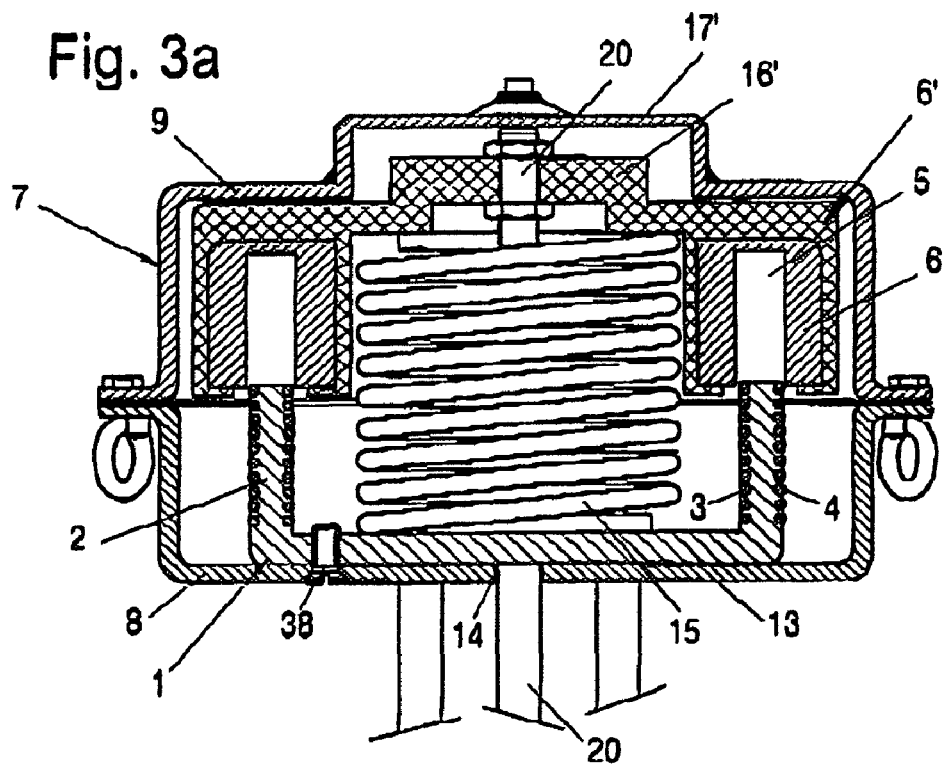
FIG. 3a is a schematically simplified sectional view of an electromagnetic actuator, in which a push rod is connected to a permanent magnet as the actively moving part.

As is shown in FIGS. 1a and 3a, it is, however, also readily possible to provide the permanent magnet 6 as the actively moving part for both working methods, i.e., for both the pushing operation and the pulling operation.

However, it is advantageous now to provide the permanent magnet 6 with a pot-like jacket 6' made of a plastic or non-magnetic diecast material, to the front wall 16' of which the pull rod 21 or the push rod 20 is fastened. To make it possible to transmit the axial motions of the permanent magnet 6, which is under the influence of the resetting spring 15, to the pull rod 21 or the push rod 20 without clearance, it is necessary to establish a permanently clearance-free connection between the jacket 6' and the permanent magnet 6, which can be best achieved by a positive-locking connection, in which the jacket 6' surrounds the mutually opposite front surfaces of the ring-shaped permanent magnet 6 at least partially.

It can be recognized that the pull rod 21 is connected to the mobile part, i.e., the permanent magnet 6, in the embodiment according to FIG. 1 a, in which the arrangement of the solenoid plunger 1 and of the permanent magnet 6 corresponds to that in FIG. 1. By contrast, the push rod 20 is connected to the mobile part, i.e., to the permanent magnet 6, in the embodiment according to FIG. 3a, which corresponds to that according to FIG. 3 concerning the arrangement of the solenoid plunger 1 and the permanent magnet 6. Thus, the motion conditions are kinematically reversed in both cases while the arrangement of the components in the operative position is analogous. The solenoid plungers 1 are always the actively moving parts in the embodiments according to FIGS. 1 and 3, whereas the permanent magnets 6 are the actively moving parts in the embodiments according to 1a and 3a. The pushing and pulling motions are automatically transposed.

It shall be expressly mentioned that intermediate positions of the respective movable parts, i.e., of the solenoid plunger 1 and of the permanent magnet 6, can also be reached with all embodiments of this actuator when the magnet coils 3, 4 are energized accordingly by the electronic control unit. Another intermediate position can also be reached from any intermediate position.

While specific embodiments of the invention have been shown and described in detail to illustrate the application of the principles of the invention, it will be understood that the invention may be embodied otherwise without departing from such principles.

What is claimed is:

1. An actuator for control valves and/or shut-off devices, the actuator comprising:
   an electromagnetic drive unit comprising a moving coil, said moving coil including a magnet coil and a cylindrical solenoid plunger, said cylindrical solenoid plunger having a resetting spring, said moving coil being mounted for movement such that said moving coil is movable to opposite end positions and a plurality of positions in between said end positions along an axial direction, whereby said moving coil defines an axially movable part of said electromagnetic drive unit;
   an actuating element for acting on a closing or opening element, said actuating element comprising a push or pull rod, said push or pull rod being connected to one of said permanent magnet and said moving coil such that said push or pull rod moves from an operative position to an inoperative position, said resetting spring maintaining said push or pull rod in said inoperative position;
   an electronic actuating amplifier receiving a command signal, said command signal defining a predetermined position of said actuating element;
   an electrical or electronic position controller, said position controller detecting an actual position of said actuating element, said position controller transmitting the actual position of said actuating element to said electronic actuating amplifier, said electronic actuating amplifier supplying a working voltage, which can be varied between a minimum and a maximum for actuating the actuating element, to said moving coil based on feedback, said electronic actuating amplifier increasing said working voltage to said maximum until said actual position of said actuating element received from said position controller is at said predetermined position, said maximum of said working voltage being able to be applied in each of said opposite end positions and said plurality of in between positions to selectively hold said electromagnetic drive unit in each of respective said positions.

2. An actuator in accordance with claim 1, wherein said actuating amplifier includes a rectifier unit, a voltage controller and a control unit, said control unit including a microprocessor, said microprocessor controlling said voltage controller, said microprocessor receiving said command signal and said actual position of said actuating element from said position controller.

3. An actuator in accordance with claim 1, wherein said position controller has a path transducer, said path transducer controlling a current controller based on said actual position of said actuating element, said current controller being electrically connected to said control unit, said current controller generating a position signal based on said actual position of said actuating element.

4. An actuator in accordance with claim 1, wherein said magnet coil is arranged on an inner and/or outer circumferential surface of a cylinder wall of said solenoid plunger, said cylinder wall comprising a magnetizable material, said solenoid plunger moving into a coaxial annular groove defined by an axially polarized permanent magnet when said magnet coil is electrically excited, said annular groove being coaxial with said magnet coil.

5. An actuator in accordance with claim 4, wherein said permanent magnet has a shape of a cylindrical ring, said annular groove being open on one side of said cylindrical ring.

6. An actuator in accordance with claim 4, wherein said solenoid plunger is connected as an actively moving part to said push rod or pull rod in a coaxial position via a radial connection element arranged on a front side of said solenoid plunger.

7. An actuator in accordance with claim 6, wherein said radial connection element of said plunger cylinder comprises a closed front wall.

8. An actuator in accordance with claim 4, wherein said permanent magnet is connected as an actively moving part to said push or pull rod via a connection element.

9. An actuator in accordance with claim 8, wherein said connection element comprises a nonmagnetic, pot-shaped jacket made of plastic or diecast material.

10. An actuator in accordance with claim 4, wherein said solenoid plunger, said resetting spring and said permanent magnet are arranged in a two-part housing.

11. An actuator in accordance with claim 4, wherein said solenoid plunger is provided with at least two said moving coils, which can be energized separately or together.

12. An actuator in accordance with claim 1, wherein said position controller is connected to a position display or indicator.

13. An actuator in accordance with claim 1, wherein said position controller has a path transducer, said path transducer controlling a position signal transmitter, said position signal transmitter comprising a current controller.

14. An actuator in accordance with claim 1, wherein:
said actuating amplifier is supplied with a supply voltage of 220/230/240 VAC or 380/400/440/600 VAC, and a rectifier unit is arranged in said actuating amplifier to rectify said supply voltage, said maximum of said working voltage being equal to the supply voltage.

15. An actuator for control valves and/or shut-off devices, the actuator comprising:
an electromagnetic drive unit comprising a resetting spring, a magnet, a magnet coil and a solenoid plunger, said magnet coil being connected to said solenoid plunger, wherein one of said magnet and said solenoid plunger defines an axial movable part of said electromagnetic drive unit, said magnet coil and said solenoid plunger being relatively axially movable between opposite axial end positions and a plurality of positions in between said end positions;
an actuating element for acting on a closing or opening element, said actuating element comprising a push or pull rod, said push or pull rod being connected to said electromagnetic drive unit such that said push or pull rod moves from a first position to a second position, said resetting spring being compressed when said push or pull rod is in said first position, said resetting spring being in tension when said push or pull rod is in said second position;
an electronic actuating amplifier receiving a command signal as input, said command signal corresponding to a predetermined position of said actuating element, said electronic actuating amplifier receiving a supply voltage for operating said electromagnetic drive unit;
a position controller, said position controller transmitting a position signal as input to said electronic actuating amplifier, said position signal corresponding to an actual position of said actuating element, said electronic actuating amplifier supplying voltage to said magnet coil based on a comparison of said position signal with said command signal such that said actuating element is moved to said predetermined position when said position signal corresponds with said command signal, said actuating amplifier increasing said voltage to said magnet coil to a maximum amount of said supply voltage when necessary to have said position signal correspond with said command signal, said maximum of said voltage to said magnet coil being able to be applied in each of said opposite end positions and said plurality of in between positions to selectively hold said electromagnetic drive unit in each of respective said positions.

16. An actuator in accordance with claim 15, wherein said actuating amplifier includes a rectifier unit, a voltage controller and a control unit, said control unit including a microprocessor, said microprocessor controlling said voltage controller, said microprocessor receiving said command signal and said position signal from said position controller.

17. An actuator in accordance with claim 15, wherein said magnet coil is arranged on an inner and/or outer circumferential surface of a cylinder wall of said solenoid plunger, said cylinder wall comprising a magnetizable material, said solenoid plunger moving into a coaxial annular groove defined by an axially polarized permanent magnet when said magnet coil is electrically excited, said annular groove being coaxial with said magnet coil.

18. An actuator for control valves and/or shut-off devices, the actuator comprising:
an electromagnetic drive unit comprising a coil and a magnet, with said coil and said magnet being movably connected relative to each other in an actuation direction, said coil and said magnet being arranged to selectively move toward and away from each other when an electric voltage is applied to said coil, said electromagnetic drive unit varying a force of the movement toward and away from each other depending upon a magnitude of the voltage applied to said coil;
an actuating element connected on one end to one of said coil and said magnet, said actuating element being connected on another end to one of the control valves or shut-off devices, said actuating element moving with said one of said coil and said magnet;
a position sensor connected to said actuator element and providing a position signal representing a position of said actuating element;
a control unit connected to said position sensor and receiving said position signal, said control unit being connected to said electromagnetic drive unit and selectively applying a varying driving voltage to said electromagnetic drive unit, said control unit having a command signal input receiving a command signal indicating a desired position of said actuating element, said control unit having a supply voltage input and receiving supply voltage from said supply voltage input, said control unit comparing said position signal and said command signal, said control unit selectively varying a magnitude of said driving voltage applied to said electromagnetic drive unit to minimize a difference between said command signal and said position signal, said control unit increasing said magnitude of said drive voltage to a maximum value of said supply voltage when necessary to minimize said difference between said command and position signal.

19. An actuator in accordance with claim 18, wherein:
said coil and said magnet are movable in said actuation direction between two opposite end positions, and movable to a plurality of positions in between said two opposite end positions;
said control unit applies said driving voltage to selectively hold said coil and said magnet in each of respective said positions, said control unit selectively applies said maximum value of said supply voltage in all of said positions when necessary to minimize said difference between said command and position signal.

20. An actuator in accordance with claim 18, wherein:
said supply voltage is 220/230/240 VAC or 380/400/440/600 VAC, and a rectifier unit is arranged between said control unit and said electromagnetic drive to rectify said driving voltage;
said command signal represents the desired position of said actuating element by a specific current intensity.

\* \* \* \* \*

UNITED STATES PATENT AND TRADEMARK OFFICE
CERTIFICATE OF CORRECTION

| | |
|---|---|
| PATENT NO. | : 8,018,709 B2 |
| APPLICATION NO. | : 12/034804 |
| DATED | : September 13, 2011 |
| INVENTOR(S) | : Kurt Barabas-Lammert |

It is certified that error appears in the above-identified patent and that said Letters Patent is hereby corrected as shown below:

Title Page

Item 76 should read

Kurt BARABAS-LAMMERT, PhD.

Signed and Sealed this
Twenty-eighth Day of February, 2012

David J. Kappos
*Director of the United States Patent and Trademark Office*